(12) United States Patent
Sohn et al.

(10) Patent No.: US 7,777,959 B2
(45) Date of Patent: Aug. 17, 2010

(54) MICROMIRROR ARRAY LENS WITH FIXED FOCAL LENGTH

(75) Inventors: Jin Young Sohn, Seoul (KR); Cheong Soo Seo, Seongnam (KR); Gyoung Il Cho, Seoul (KR)

(73) Assignees: Angstrom, Inc., Soongnam (KR); Stereo Display, Inc., Anaheim, CA (US)

( * ) Notice: Subject to any disclaimer, the term of this patent is extended or adjusted under 35 U.S.C. 154(b) by 42 days.

(21) Appl. No.: 11/426,565

(22) Filed: Jun. 26, 2006

(65) Prior Publication Data

US 2006/0245067 A1 Nov. 2, 2006

Related U.S. Application Data

(63) Continuation-in-part of application No. 10/855,554, filed on May 27, 2004, now Pat. No. 6,970,284, and a continuation-in-part of application No. 10/855,715, filed on May 27, 2004, now Pat. No. 7,031,046, and a continuation-in-part of application No. 10/855,287, filed on May 27, 2004, now Pat. No. 6,934,072, and a continuation-in-part of application No. 10/857,796, filed on May 28, 2004, now Pat. No. 6,934,073, and a continuation-in-part of application No. 10/857,714, filed on May 28, 2004, now Pat. No. 7,161,729, and a continuation-in-part of application No. 10/857,280, filed on May 28, 2004, now Pat. No. 6,999,226, and a continuation-in-part of application No. 10/872,241, filed on Jun. 18, 2004, now Pat. No. 7,382,516, and a continuation-in-part of application No. 10/893,039, filed on Jul. 16, 2004, now Pat. No. 7,239,438, and a continuation-in-part of application No. 10/983,353, filed on Nov. 8, 2004, now Pat. No. 7,267,447, and a continuation-in-part of application No. 11/072,597, filed on Mar. 4, 2005, now Pat. No. 7,330,297, and a continuation-in-part of application No. 11/072,296, filed on Mar. 4, 2005, now abandoned, and a continuation-in-part of application No. 11/076,616, filed on Mar. 10, 2005, now Pat. No. 7,274,517, and a continuation-in-part of application No. 11/191,886, filed on Jul. 28, 2005, now Pat. No. 7,095,548, and a continuation-in-part of application No. 11/347,590, filed on Feb. 4, 2006, and a continuation-in-part of application No. 11/369,797, filed on Mar. 6, 2006, now Pat. No. 7,474,454.

(51) Int. Cl.
*G02B 27/10* (2006.01)
(52) U.S. Cl. ...................................... 359/627
(58) Field of Classification Search ................. 359/627, 359/849, 721, 744, 811, 850, 291
See application file for complete search history.

(56) References Cited

U.S. PATENT DOCUMENTS 2,002,376 A 5/1935 Mannheimer
4,407,567 A 10/1983 Michelet (Continued)

FOREIGN PATENT DOCUMENTS

| JP | 08-043881 | 2/1996 |
|---|---|---|
| JP | 11-069209 | 3/1999 |
| JP | 2002-288873 | 10/2002 |

*Primary Examiner*—Scott J Sugarman
*Assistant Examiner*—Vipin M Patel (57) ABSTRACT

The present invention provides a Micromirror Array Lens (MMAL) with fixed focal length to reproduce a designed surface having optical focusing power. The micro mechanical structures with surface profile shape memory are fabricated and released after fabrication. Each micromirror in the MMAL has its own motion by stiction force and/or electrostatic force while and/or after the releasing process. Once the designed surface is formed, the MMAL has an optical power as a lens.

22 Claims, 9 Drawing Sheets

U.S. PATENT DOCUMENTS

| | | | |
|---|---|---|---|
| 4,834,512 A | 5/1989 | Austin | |
| 5,004,319 A | 4/1991 | Smither | |
| 5,212,555 A | 5/1993 | Stoltz | |
| 5,369,433 A | 11/1994 | Baldwin | |
| 5,402,407 A | 3/1995 | Eguchi et al. | |
| 5,467,121 A | 11/1995 | Allcock | |
| 5,612,736 A | 3/1997 | Vogeley et al. | |
| 5,696,619 A | 12/1997 | Knipe | |
| 5,881,034 A | 3/1999 | Mano | |
| 5,897,195 A | 4/1999 | Choate | |
| 5,986,811 A | 11/1999 | Wohlstadter | |
| 6,025,951 A | 2/2000 | Swart | |
| 6,028,686 A * | 2/2000 | Mirell et al. | 398/201 |
| 6,028,689 A * | 2/2000 | Michalicek et al. | 359/224.1 |
| 6,064,423 A | 5/2000 | Geng | |
| 6,084,843 A | 7/2000 | Abe | |
| 6,104,425 A | 8/2000 | Kanno | |
| 6,111,900 A | 8/2000 | Suzudo | |
| 6,123,985 A | 9/2000 | Robinson | |
| 6,282,213 B1 | 8/2001 | Gutin | |
| 6,315,423 B1 | 11/2001 | Yu | |
| 6,329,737 B1 | 12/2001 | Jerman | |
| 6,445,509 B1 * | 9/2002 | Alden | 359/666 |
| 6,498,673 B1 | 12/2002 | Frigo | |
| 6,507,366 B1 | 1/2003 | Lee | |
| 6,549,730 B1 | 4/2003 | Hamada | |
| 6,625,342 B2 | 9/2003 | Staple et al. | |
| 6,639,572 B1 * | 10/2003 | Little et al. | 345/55 |
| 6,649,852 B2 | 11/2003 | Chason et al. | |
| 6,650,461 B2 | 11/2003 | Atobe et al. | |
| 6,658,208 B2 | 12/2003 | Watanabe et al. | |
| 6,711,319 B2 | 3/2004 | Hoen | |
| 6,741,384 B1 | 5/2004 | Martin | |
| 6,784,771 B1 | 8/2004 | Fan | |
| 6,833,938 B2 | 12/2004 | Nishioka | |
| 6,885,819 B2 | 4/2005 | Shinohara | |
| 6,900,901 B2 | 5/2005 | Harada | |
| 6,900,922 B2 | 5/2005 | Aubuchon | |
| 6,906,848 B2 | 6/2005 | Aubuchon | |
| 6,906,849 B1 | 6/2005 | Mi | |
| 6,914,712 B2 | 7/2005 | Kurosawa | |
| 6,919,982 B2 | 7/2005 | Nimura et al. | |
| 6,934,072 B1 | 8/2005 | Kim | |
| 6,934,073 B1 | 8/2005 | Kim | |
| 6,943,950 B2 | 9/2005 | Lee | |
| 6,958,777 B1 | 10/2005 | Pine | |
| 6,970,284 B1 | 11/2005 | Kim | |
| 6,995,909 B1 | 2/2006 | Hayashi et al. | |
| 6,999,226 B2 | 2/2006 | Kim et al. | |
| 7,023,466 B2 | 4/2006 | Favalora et al. | |
| 7,031,046 B2 | 4/2006 | Kim et al. | |
| 7,046,447 B2 * | 5/2006 | Raber | 359/625 |
| 7,068,416 B2 | 6/2006 | Gim et al. | |
| 7,077,523 B2 | 7/2006 | Seo et al. | |
| 7,161,729 B2 | 1/2007 | Kim et al. | |
| 7,267,447 B2 * | 9/2007 | Kim et al. | 359/846 |
| 2002/0018407 A1 | 2/2002 | Komoto | |
| 2002/0102102 A1 | 8/2002 | Watanabe | |
| 2002/0135673 A1 | 9/2002 | Favalora | |
| 2003/0058520 A1 | 3/2003 | Yu | |
| 2003/0071125 A1 | 4/2003 | Yoo | |
| 2003/0174234 A1 | 9/2003 | Kondo | |
| 2003/0184843 A1 | 10/2003 | Moon | |
| 2004/0009683 A1 | 1/2004 | Hiraoka | |
| 2004/0012460 A1 | 1/2004 | Cho | |
| 2004/0021802 A1 | 2/2004 | Yoshino | |
| 2004/0052180 A1 | 3/2004 | Hong | |
| 2004/0246362 A1 | 12/2004 | Konno | |
| 2004/0252958 A1 | 12/2004 | Abu-Ageel | |
| 2005/0024736 A1 | 2/2005 | Bakin | |
| 2005/0057812 A1 | 3/2005 | Raber | |
| 2005/0094241 A1 * | 5/2005 | Ishii | 359/290 |
| 2005/0136663 A1 | 6/2005 | Gan et al. | |
| 2005/0174625 A1 | 8/2005 | Huiber | |
| 2005/0180019 A1 | 8/2005 | Cho | |
| 2005/0212856 A1 | 9/2005 | Temple | |
| 2005/0224695 A1 | 10/2005 | Mushika | |
| 2005/0225884 A1 | 10/2005 | Gim | |
| 2005/0231792 A1 | 10/2005 | Alain | |
| 2005/0264870 A1 | 12/2005 | Kim | |
| 2006/0007301 A1 * | 1/2006 | Cho et al. | 348/51 |
| 2006/0012766 A1 | 1/2006 | Klosner | |
| 2006/0012852 A1 | 1/2006 | Cho | |
| 2006/0028709 A1 | 2/2006 | Cho | |
| 2006/0187524 A1 | 8/2006 | Sandstrom | |
| 2006/0209439 A1 | 9/2006 | Cho | |

* cited by examiner

MICROMIRROR ARRAY LENS WITH FIXED FOCAL LENGTH

REFERENCE TO RELATED APPLICATION

This application is a continuation-in-part of, and claims priority to U.S. patent application Ser. No. 10/855,554 filed May 27, 2004, U.S. patent application Ser. No. 10/855,715 filed May 27, 2004, U.S. patent application Ser. No. 10/855,287 filed May 27, 2004, U.S. patent application Ser. No. 10/857,796 filed May 28, 2004, U.S. patent application Ser. No. 10/857,714 filed May 28, 2004, U.S. patent application Ser. No. 10/857,280 filed May 28, 2004, U.S. patent application Ser. No. 10/872,241 filed Jun. 18, 2004, U.S. patent application Ser. No. 10/893,039 filed Jul. 16, 2004, U.S. patent application Ser. No. 10/983,353 filed Nov. 8, 2004, U.S. patent application Ser. No. 11/072,597 filed Mar. 4, 2005, U.S. patent application Ser. No. 11/072,296 filed Mar. 4, 2005, U.S. patent application Ser. No. 11/076,616 filed Mar. 10, 2005, U.S. patent application Ser. No. 11/191,886 filed Jul. 28, 2005, U.S. patent application Ser. No. 11/347,590 filed Feb. 04, 2006, and U.S. patent application Ser. No. 11/369,797 filed Mar. 06, 2006, all of which are hereby incorporated by reference.

FIELD OF INVENTION

The present invention relates to lens fabrication and designing, more specifically, Micromirror Array Lens (MMAL) fabrication.

BACKGROUND OF THE INVENTION

These days, fabrication of an aspherical lens becomes popular for reducing aberration problems to make small optical systems. Hand-held optical systems such as camera phone, portable digital camera and camcorder accelerate the usage of the small optics and aspherical lenses. In spite of the demanding need for aspherical lenses, the aspherical lens is not widely used, since the process for fabricating an aspherical lens is a hard process until now. Apart from aspherical lenses, making non-spherical lens for example parabolic, cylindrical, or array of lenses, is also time consuming and difficult process.

Also fabricating a large lens gives another difficulty for lens makers. Fresnel type lens is a good solution for making large lenses without handling large and heavy materials. But the quality of the Fresnel lens is not that good as the conventional spherical lens. Fresnel lens offers only procedure reducing thickness. While making a large optics, aberration control is another serious problem other than fabrication itself. As the size of the lens becomes larger, the aberration of the lens system becomes severe. This is especially critical for the spherical lens system. The main reason for using the aspherical lens is to reduce the aberration of the optical system. Again the fabrication process of the aspherical lens is far more difficult than that of the spherical lens.

To overcome the difficulties in fabricating lenses, a new method for lens fabrication is introduced. Gradient index lens is a good example. Instead of geometrical variation, change of index of refraction gives the same effect as a lens. Using the gradient index of material and geometrical variation together, aberration of the system can be reduced. Although the gradient index lens gives significant reduction of the aberration, it is still expensive and hard to be fabricated.

In the present invention, the inventors provide a new method of lens fabrication introducing Micromirror Array Lens (MMAL). MMAL was invented for variable focal length lens and the properties of MMAL can be found in the U.S. Pat. No. 6,934,072 to Kim, U.S. Pat. No. 6,934,073 to Kim, U.S. Pat. No. 6,970,284 to Kim, U.S. Pat. No. 7,031,046 to Kim, U.S. patent application Ser. No. 10/857,714 filed May 28, 2004, U.S. Pat. No. 6,999,226 to Kim, U.S. patent application Ser. No. 10/893,039 filed Jul. 16, 2004, U.S. patent application Ser. No. 10/983,353 filed Mar. 4, 2005, and U.S. patent application Ser. No. 11/191,886 filed Jul. 28, 2005. While maintaining converge and phase condition of the MMAL, the MMAL can be fabricated to have a fixed focal length instead of variable focal lengths. The fixed focal length MMAL has lot of advantages and can solve the fabrication problems of the conventional lens.

First, the fabrication process of the MMAL is size independent. Since the MMAL is using standard semiconductor fabrication processes, making process of the MMAL is only dependent on the substrate wafer size. If the size of the lens is less than that of substrate wafer, then fabrication process is the same. Second, different kinds of lenses can be fabricated together. While fabricating the conventional lenses, the curvature of the lens determines the fabrication capability. Only one kind of lens can be fabricated together. While fabricating the MMAL, many different kinds of the MMALs can be fabricated together. Third, since the MMAL is an adaptive optical element, aberration of the system can be corrected by introducing the MMAL. Conventional lens has a severe problem due to aberration. Each micromirror can be designed to correct the problems of aberration of the optical system. Fourth, mass productivity is a major advantage of the MMAL. Since MMAL is fabricated by using standard semiconductor procedures, mass production of lenses can be easily achieved. Also since the MMAL is arranged in a flat surface, the MMAL reduces the size of the optical system and also critically reduces the problems of mounting optics. And last, the fixed focal length MMAL has a great advantage over variable focal length MMAL. Since the structure of the micromirror can be simplified, the fabrication becomes extremely simple. Also the production price is very cheap so that the fixed focal length MMAL can substitute the conventional lens in optical systems.

In the present invention, the fabrication process is made simple and the lens surface forming process is newly invented. By introducing the MMAL with surface profile shape memory, simple MMAL can be fabricated without loosing the great advantages of the MMAL.

SUMMARY OF THE INVENTION

An object of the present invention is to provide a new method for fabrication of a lens using Micromirror Array Lens (MMAL) overcoming obstacles of the conventional lens using MMAL. Fabricating a lens is very difficult depending on its size, surface profile, material properties (index of refraction) and shape. The present invention of MMAL with fixed focal length provides a new method of lens fabrication virtually independent of its size, surface profile, and shape. Also since the MMAL is a reflective type lens, the material properties are not a barrier for fabricating a lens any more.

The properties of MMAL can be found in the U.S. Pat. No. 6,934,072 to Kim, U.S. Pat. No. 6,934,073 to Kim, U.S. Pat. No. 6,970,284 to Kim, U.S. Pat. No. 7,031,046 to Kim, U.S. patent application Ser. No. 10/857,714 filed May 28, 2004, U.S. Pat. No. 6,999,226 to Kim, U.S. patent application Ser. No. 10/893,039 filed Jul. 16, 2004, U.S. patent application Ser. No. 10/983,353 filed Mar. 4, 2005, and U.S. patent application Ser. No. 11/191,886 filed Jul. 28, 2005, all of which are hereby incorporated by reference.

By introducing surface profile shape memory, MMAL can form a designed surface and have a function of lens as the property of the surface. The surface profile shape memory remembers a designed surface for the MMAL and the designed surface is formed after fabricating the MMAL. The MMAL with fixed focal length is fabricated with surface profile shape memory. After fabrication of the MMAL, the MMAL forms a lens with fixed focal length. The forming process of the designed surface after fabrication is a great advantage of the surface profile shape memory. The forming process of a MMAL is accomplished either while the micro mechanical structures are released by removing sacrificial layers or while the initial operation of the MMAL. Once the designed surface is formed, the property of the MMAL is fixed and the MMAL performs its function of a lens.

Another objective of the present invention is to provide a low price lens with a designed surface to replace the current commercial lens optics. With mass productivity of semiconductor industry, the micromirror with fixed focal length having surface profile shape memory can be fabricated in a low price. Thanks to the easy variation of the MMAL, the designed surface can be easily formed in a MMAL and can be simply fabricated by the mass production process.

A great advantage of the present invention is that since the MMAL has its own designed surface after fabrication, the MMAL can have different surface profile thus different properties even though the fabrication processes are exactly the same including all processing conditions. Even in the same wafer, many different MMALs can be fabricated altogether. All the MMALs find their own designed surface with surface profile shape memory and finally settled down for usage as a lens.

In the present invention, the MMAL with fixed focal length comprises a plurality of micromirrors. The micromirrors form a designed surface to have an optical focusing power as a lens. The designed surface is defined as a diffractive optical element and determined by the structure of the micromirrors.

The surface profile shape memory is built in the structures of micro mechanical elements of the micromirrors in the MMAL. The structure of micro mechanical elements of each micromirror is fabricated to determine the motion of the micromirror and to form a designed surface.

After fabrication of the MMAL, each micromirror finds their motion with respect to the surface profile shape memory of the MMAL. The designed surface defined by the surface profile shape memory is formed by stiction force between micromirror mechanical structures and/or electrostatic force between the micro mechanical structures. Adjusting and controlling the stiction force and/or electrostatic force between the micro mechanical structures, each micromirror in the MMAL form a designed surface with respect to the surface profile shape memory and make a lens.

The designed surface can be formed by the stiction force between the micro mechanical elements in the MMAL while releasing the micromirror structures. Also the designed surface is formed by the initial operation of the MMAL. Since each micromirror in the MMAL can have many different motions, the initial operation can determine the designed surface and the designed surface can be fixed for future usage as a fixed focal length MMAL. After determining the designed surface, the surface is maintained by the stiction force and/or electrostatic force between micro mechanical structures.

The designed surface is determined with respect to the surface profile shape memory. To form a designed surface, the motion of each micromirror is determined by at least one support upholding the micromirror. The support or supports are located between the reflecting surface of the micromirror and the substrate of the MMAL device. The heights and the positions of the support or supports define the designed surface. Height and position variation makes the micromirror motion possible.

Since the MMAL comprises a plurality of micromirrors, a micromirror array can be divided into parts and each part can form a different MMAL. Thus one MMAL can form an array of MMAL. A plurality of micromirrors in the MMAL form a MMAL or array of MMAL.

To have an optical power, a reflective surface should be non-flat for conventional optics. On the contrary, the designed surface of the MMAL is formed and arranged in a flat surface. MMAL can have an optical power of non-flat surface even if it is formed in a flat surface. Each micromirror in the MMAL has its own translational and rotational motion to have an optical power of a non-flat surface. Also the MMAL can be formed and arranged in a surface with a curvature.

To form a good lens two major conditions must be satisfied. One is the convergence condition that every light should be converged into a focal point. And the other is the phase matching condition that the phase of the converged light should be the same. In a conventional lens, the phase matching condition is that all the light passing through a lens should have the same optical path length to the focal point. But MMAL uses the periodicity of the light to satisfy the phase matching condition. Since the same phase condition occurs periodically, the phase matching condition can be satisfied even though the optical path length is different. Each micromirror in the MMAL can be controlled to satisfy the phase matching condition and the convergence condition.

Since the designed surface of the MMAL acts as a lens, the designed surface satisfies the convergence condition to form a lens. Also the designed surface of the MMAL should satisfy the phase matching condition to form a lens. The convergence and phase matching conditions are satisfied by the structure of the micro mechanical structures and/or the motion of each micromirror in the MMAL.

Since the MMAL is a kind of adaptive optics, the MMAL can correct aberration of the system. The designed surface of the MMAL is prepared to correct aberration of the system.

The optical focusing power of the MMAL is determined by the properties of the designed surface. The designed surface can reproduce conic surfaces, aspherical surfaces, and anamorphic aspherical surfaces. Also the designed surface reproduces free surface. As much as the designed surface produces continuous surface profiles, the designed surface can reproduce discrete surfaces. The designed surface reproduces a Fresnel type reflective lens. Also the designed surface reproduces a diffractive optical element.

Each micromirror in the MMAL has its own translational and rotational motions to form a lens. Rotational motion is usually defined to satisfy the convergence condition of lens and translational motion is defined to satisfy the phase matching condition.

In a specific embodiment of the present invention, the shape and/or size of each micromirror is varied for forming a designed surface. The variable size and shape is determined to satisfy the phase matching condition instead of using translational motion. The size of each micromirror is determined to satisfy the phase matching condition.

The MMAL with fixed focal length of the present invention has advantages: (1) the lens with surface profile shape memory provides an easy fabrication of lens system; (2) fabrication of the lens is size-independent; (3) fabrication of the lens is surface profile or shape independent; (4) fabrication of the lens is material independent; (5) the surface profile of the lens is formed after fabrication; (6) the lens can be fabricated in a low price; (7) different shape or size lenses can be fabricated together; (8) the lens is an adaptive optics; (9) aberration of the system can be corrected; (10) the lens has a simple structure.

Although the present invention is briefly summarized, the full understanding of the invention can be obtained by the following drawings, detailed description, and appended claims.

DESCRIPTION OF THE FIGURES

These and other features, aspects and advantages of the present invention will become better understood with reference to the accompanying drawings, wherein.

DETAILED DESCRIPTION OF THE INVENTION

Figure 1:
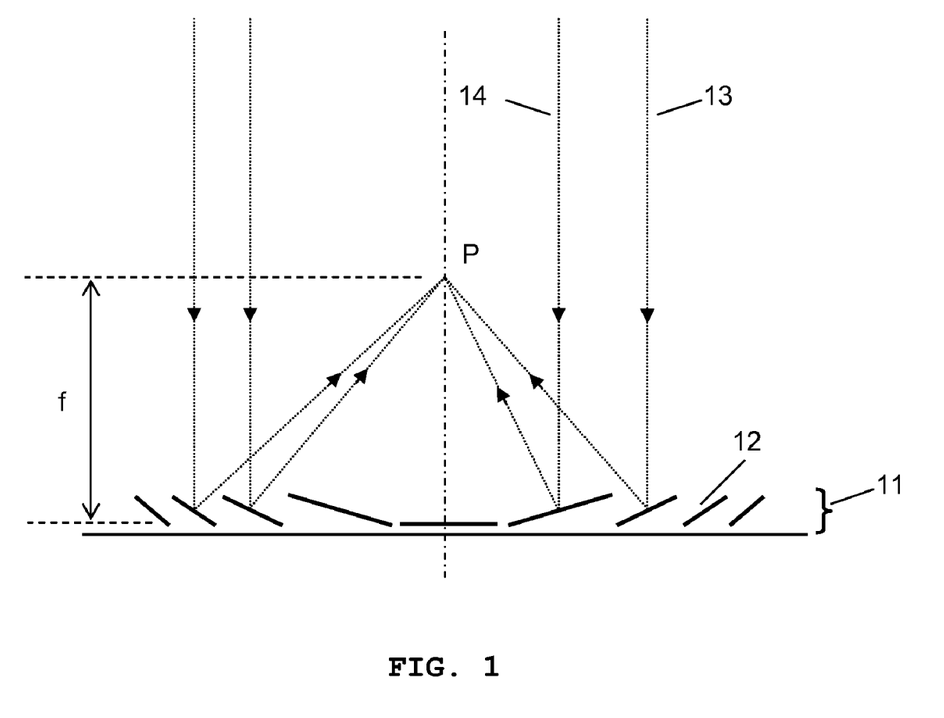
FIG. 1 shows the principles of the Micromirror Array Lens (MMAL) with different micromirror size.

FIG. 1 illustrates how the Micromirror Array Lens (MMAL) 11 images. Arbitrary scattered lights 13, 14 are converged into one point P of the image plane by controlling the motions of the micromirrors 12. The phases of arbitrary light 13, 14 can be adjusted to be same by translating the micromirrors 12. The required translational displacement is at least half of the wavelength of light.

It is desired that each of the micromirrors 12 has a curvature because the ideal shape of a conventional reflective lens has a curvature. If the size of the flat micromirror is small enough, the aberration of the lens comprising flat micromirrors 12 is also small enough. In this case, the micromirror does not need a curvature. The focal length f of the MMAL 11 is changed by controlling the rotation and the translation of each micromirror 12.

FIG. 1 also shows the principle of forming a MMAL 11 with different micromirror sizes. Basically micromirrors 12 in a MMAL 11 are arranged in a flat surface and have their own motions of rotation and translation. In this embodiment, the micromirrors are arranged to have the same translation and only the rotational motion is varied. The arbitrary incident lights 13, 14 are redirected to the focal point P by the reflection at the reflective surfaces of each micromirror 12. The rotational motion is defined to satisfy the convergence condition for forming a lens. To satisfy the phase matching condition at the focal point P, each micromirror 12 in the MMAL 11 should have its own translational motion for forming a lens. In this embodiment, the phase matching condition is satisfied by variation of the micromirror size. Size of each micromirror 12 is determined by the phase difference between the neighboring micromirrors 12. The neighboring micromirrors have the phase differences of multiple integer of light wavelength.

Figure 2:
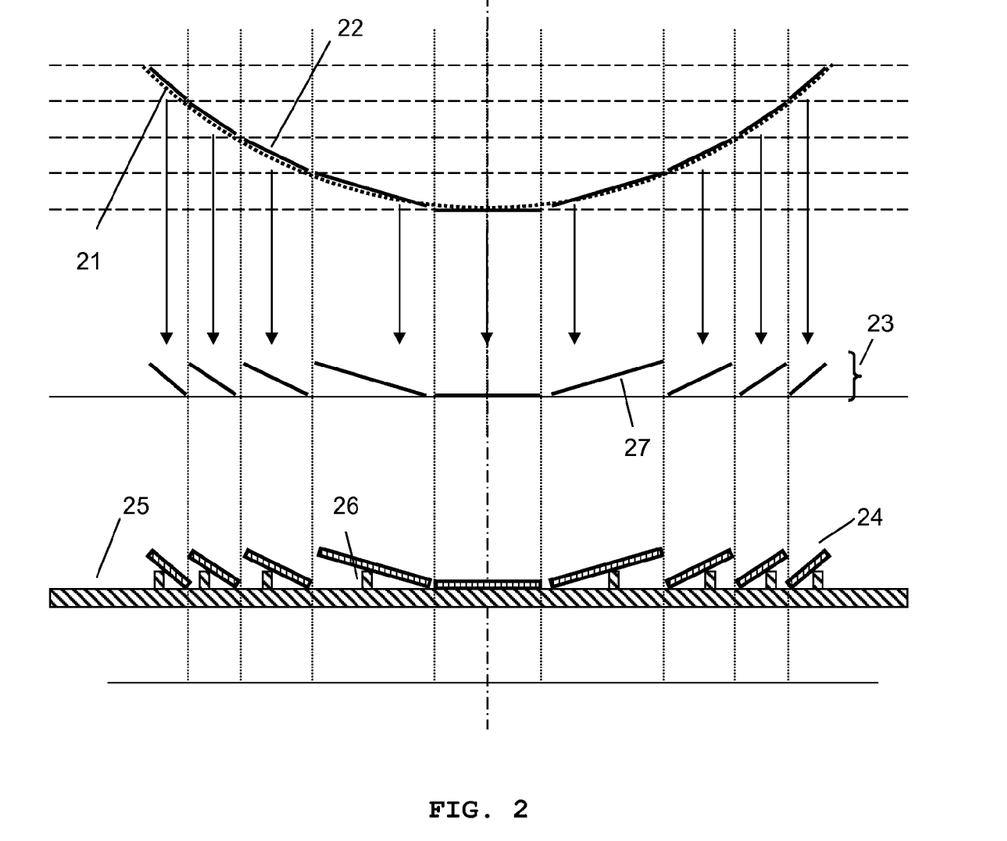
FIG. 2 shows how the designed surface is fabricated into MMAL.

FIG. 2 illustrates the relation between a conventional reflective mirror surface 21 and the micromirror motions 27 in a MMAL 23. There are two conditions to make a perfect lens. The first is the converging condition that all lights scattered by one point of an object should converge into one point of the image plane. The second is the same phase condition that all converged light should have the same phase at the image plane. To satisfy the perfect lens conditions, the surface shape of conventional reflective lens 21 is formed to have all lights scattered by one point of an objective to be converged into one point of the image plane and have the optical path length of all converging light to be same.

Since the MMAL is arranged in a flat surface, the two conditions are satisfied in a different way. The converging condition is the same but the phase matching condition is satisfied by matching the equal phase rather than the equal optical path length. Each of the micromirrors 27 has a rotational motion to redirect the scattered light into a focal point. Because all the micromirrors 27 of the MMAL 23 are arranged in a flat plane as shown in FIG. 2, the optical path lengths of lights converged by rotation of the micromirrors are different. Even though the optical path lengths of converging lights are different, the same phase condition can be satisfied by adjusting the optical path length by using the periodicity of the light. An integer multiple of wavelength difference in optical path length satisfies the same phase matching condition at the focal point.

FIG. 2 also shows how the conventional mirror surface 21 is designed and fabricated into MMAL 23. Upper part of the figure shows the conventional mirror surface 21 for optical system. The curvature of the surface is then sliced into small pieces considering the phase difference. The size of the micromirror is determined by the phase difference between the neighboring micromirrors. The phase difference can be selected as a function of wavelength of the light but should be fixed for micromirrors 27 in a MMAL 23. The sliced pieces of reflecting surface 22 are then projected into a flat surface and arranged. Middle part of the figure shows the sliced reflecting surface 22 form a MMAL 23 on a flat surface. The surface profile of the projected micromirror array forms the designed surface of the MMAL 23. Then the fabricated micromirror 24 with support 26 is plotted in bottom part of the figure. Each micromirror has a motion which is determined by the substrate 25 and the support 26. The motion is determined by the size of the micromirrors. The position of the support in micromirror is determined so that the micromirrors in the MMAL 23 reproduce the designed surface.

Figure 3:
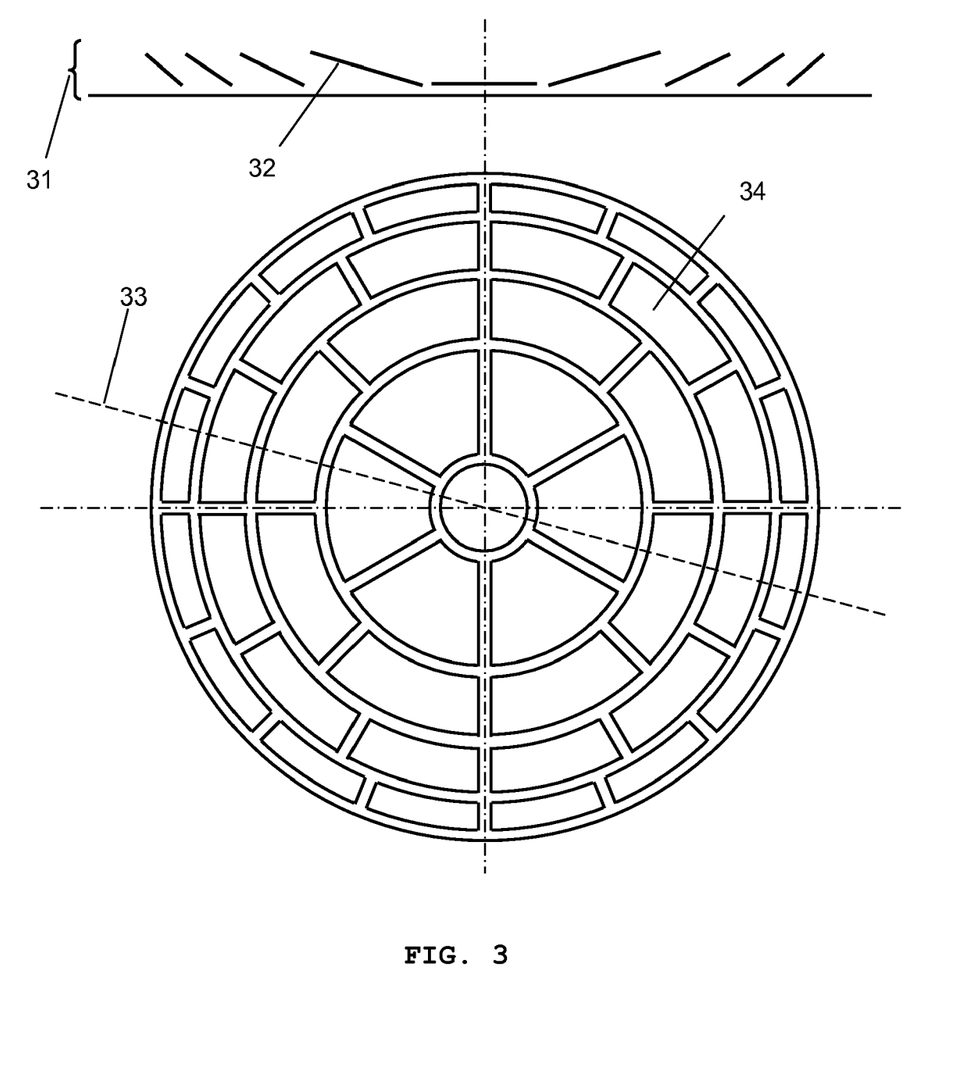
FIG. 3 shows a plane view of the MMAL and a cross-section of the MMAL.

FIG. 3 shows a plane view of the MMAL 31 and a cross section of the MMAL 31. The shape and size of micromirror 32 is selected to satisfy the phase matching condition and to have motion freedom of the micromirror. In this figure, the size along with the radial direction is determined to satisfy the phase matching condition of the MMAL. In upper part of the figure, the cross-sectional image of MMAL by the cutting line 33 is plotted. The size of micromirror 34 is reduced as the distance from the center is increased. This is because the micromirror size is determined by the phase difference between the neighboring micromirrors.

The micromirror 32 has the same function as a mirror. Therefore, the reflective surface of the micromirror 32 is made of metal, metal compound, multi-layered dielectric material, or other materials with high reflectivity. Many known microfabrication processes can make the surface with high reflectivity. In case of an axisymmetric lens, the MMAL 31 has a polar array of the micromirrors 34. Each of the micromirrors 32 has a fan shape to increase an effective reflecting area, which increases optical efficiency. The micromirrors 32 are arranged to form one or more concentric circles to form the axisymmetric lens. The mechanical support upholding each reflective micromirror 34 are located under the micromirrors 34 to increase the effective reflecting area.

Figure 4:
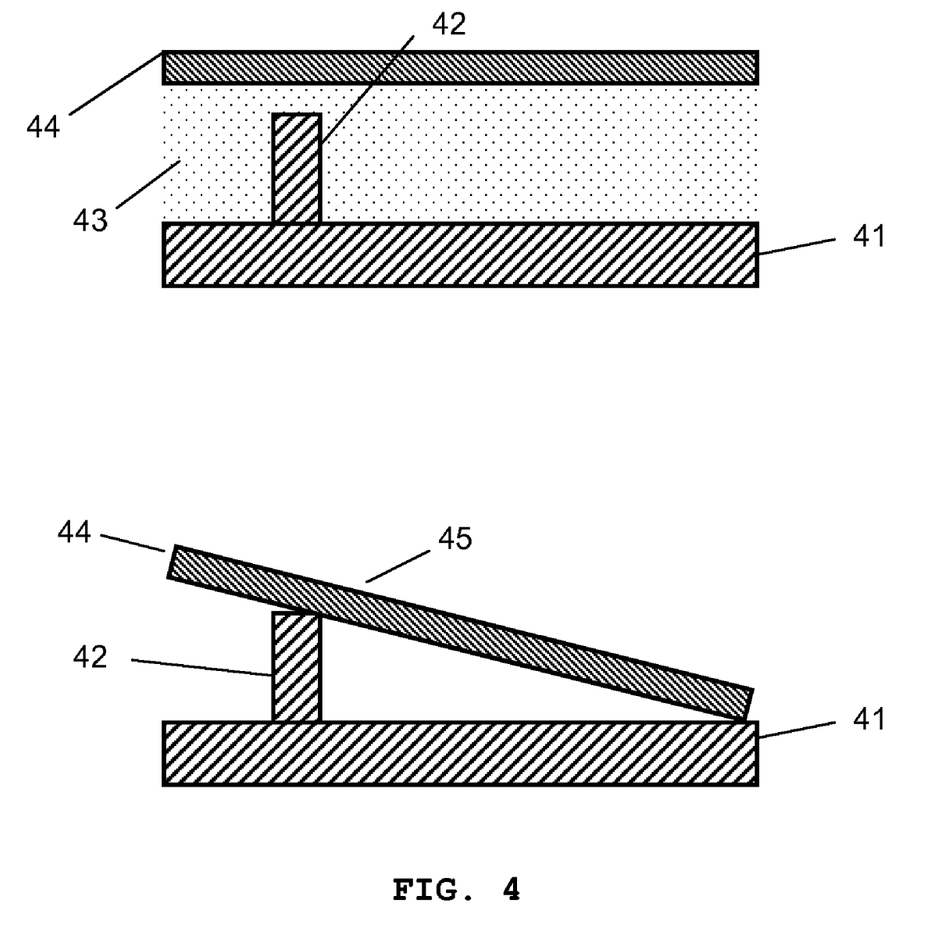
FIG. 4 illustrates a micromirror structure while fabricating the MMAL and after forming a designed surface.

FIG. 4 illustrates a micromirror structure before removing the sacrificial layer 43 of the MMAL and after forming the designed surface 45. The MMAL is fabricated on a flat substrate 41. After surface cleaning of the substrate, the support structure is grown on the substrate 41 and then sacrificial layer 43 is overgrown on top of substrate 41 and support structures 42. The overgrown sacrificial layer is then planarized by chemical mechanical polishing process. Upon the planarized surface, the micromirror structure is grown. The upper part of the figure shows the stacked structure of the micromirror 44. Then the sacrificial layer 43 is removed by releasing process of the micro structures. While releasing process, the micromirror structure is stuck down to the substrate 41. The motion of the micromirror is determined by the contact points between the micromirror structure and the substrate 41 and the contact points between the micromirror structure 44 and the support 42 under the micromirror structure 44. The MMAL makes its designed surface by the stiction force between the structure elements while the micro structures are releasing.

Figure 5:
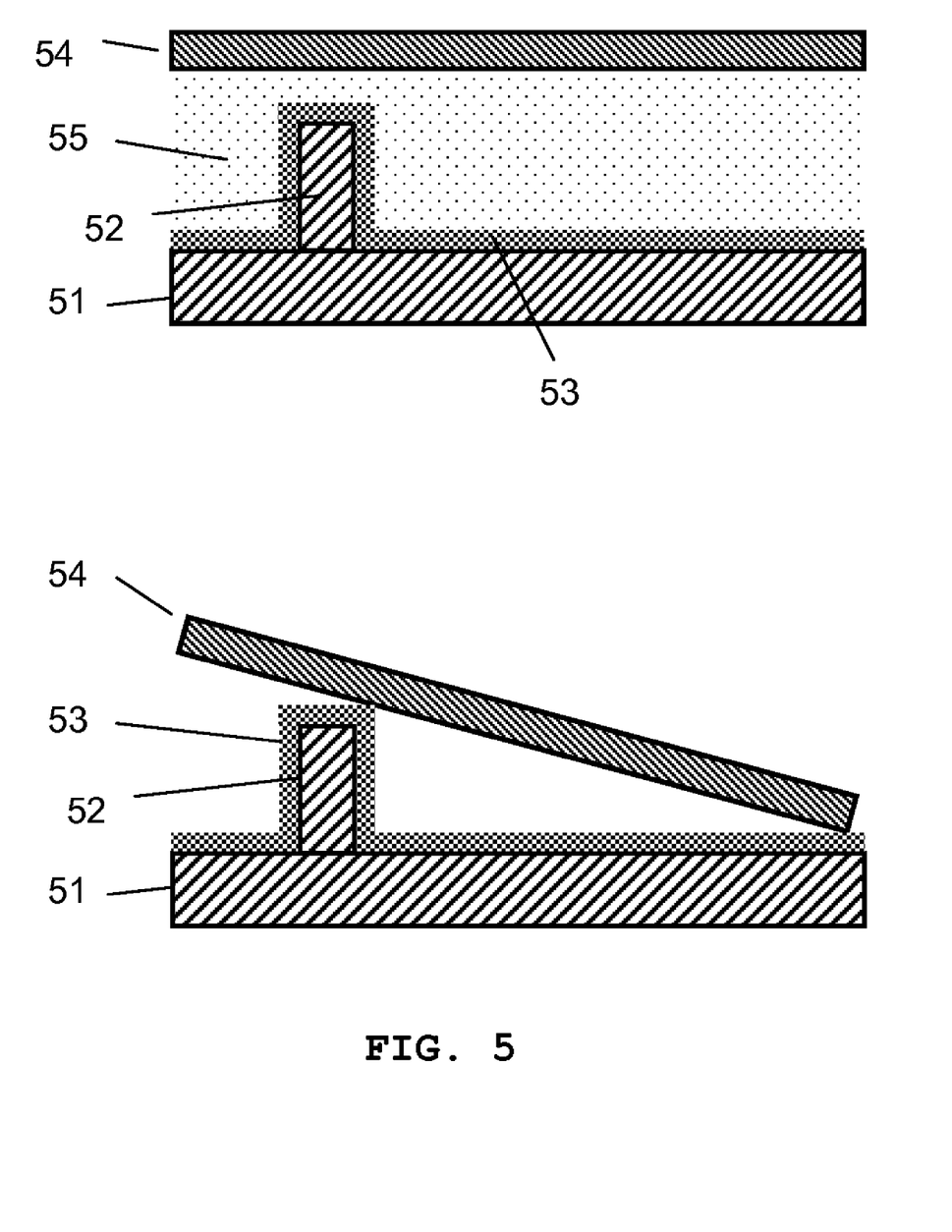
FIG. 5 illustrates a micromirror structure with passivation layer while fabricating the MMAL and after forming a designed surface.

Another structure for micromirror is illustrated in FIG. 5. Basically the structure is the same as before except for the passivation layer 53 of the micromirror structure. First the support structure 52 is grown and after that the passivation layer 53 is deposited on the substrate 51. Before growing the sacrificial layer 55, the passivation layer 53 can be built for insulating between the substrate 51 and the micromirror structure 54. And the rest process of making structure is the same as before. The sacrificial layer 55 is overgrown and then planarized by the chemical mechanical polishing process. Then micromirror structure 54 is grown on top of the planarized sacrificial surface 55. While the releasing process of the structure, the sacrificial layer 55 is removed. The substrate 51, support 52, passivation layer 53, and the micromirror structure 54 remain after the releasing process and form the designed surface. The passivation layer 53 can increase the stiction force. With the passivation layer 53, the electrostatic force between the micromirror structure 54 and the substrate 51 can be built. Even if the stiction force is not enough to make the designed surface by the surface profile shape memory, the electrostatic force can help to forming the designed surface. The passivation layer prevents the micromirror structure 54 from electronically contacting to the substrate 51.

Figure 6:
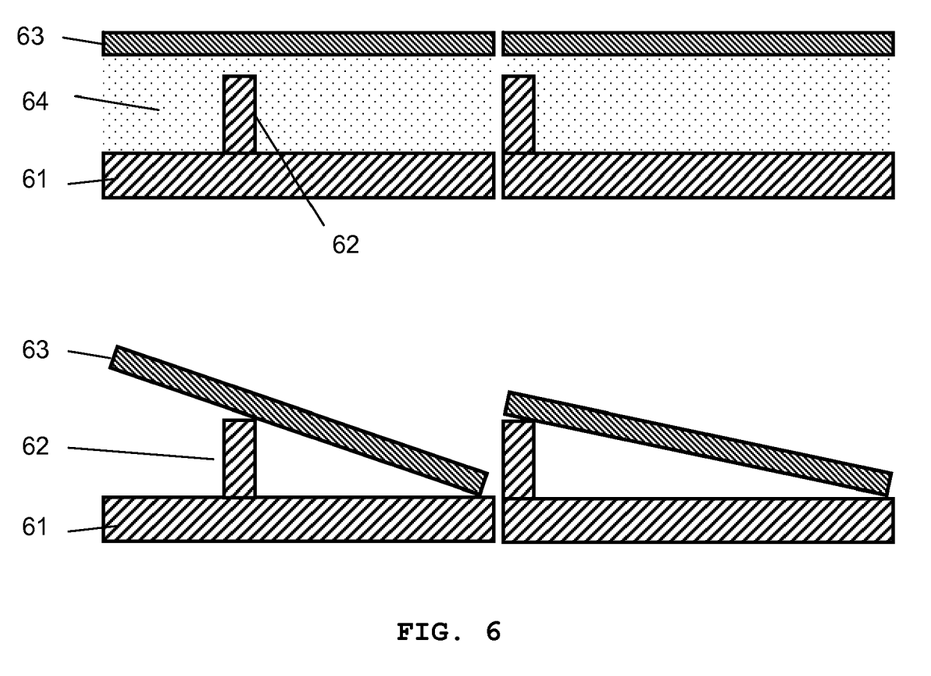
FIG. 6 illustrates two different micromirror motions defined by a single height support using variation of support positions.

In FIG. 6, the concept of the surface profile shape memory by the support 62 structure is illustrated. The fabrication process is the same as explained in the FIG. 4. The positions of the support in the micromirrors are differently determined while fabricating the MMAL. These differently positioned support 62 structure determines the final motion of the micromirror 63. In the right micromirror structure, the support 62 is located at the end of the micromirror structure. And in the left micromirror 63, the support 62 is located a little bit further inside the structure. After removing the sacrificial layer 64 to release the structures, the micromirrors 63 have two different motions defined by the support 62 and the substrate 61. The left one has a larger rotational motion than the right one. With the position of the support 62 varied, the micromirror motion can be controlled. The support positioning is a kind of surface profile shape memory. Each micromirror has its own support position which is corresponding to the designed surface. After or while the releasing process, the micromirrors form the designed surface and the designed surface is fixed as a lens.

Figure 7:
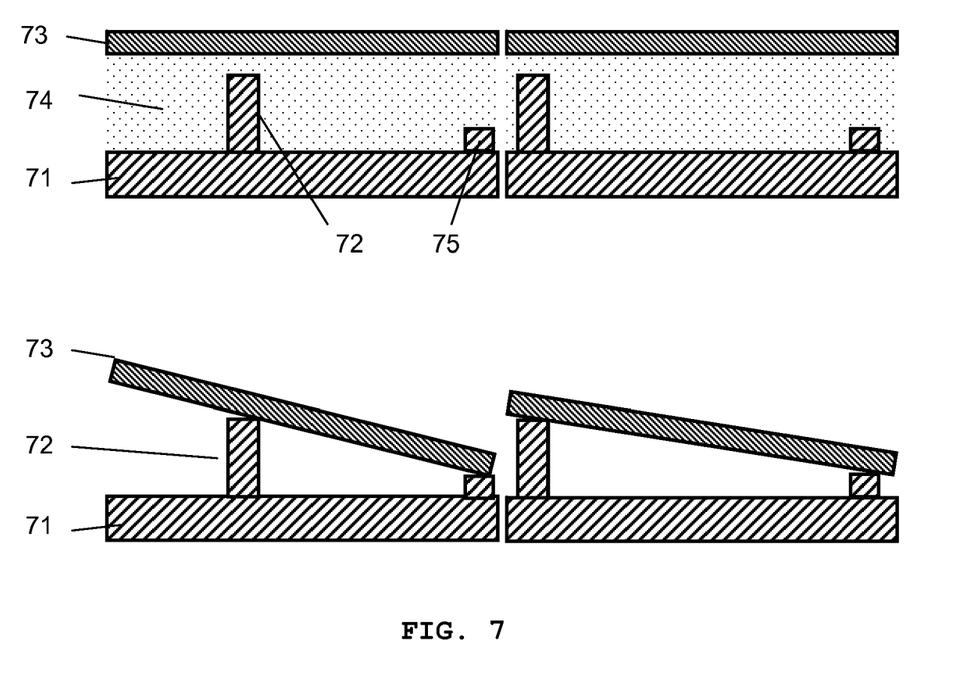
FIG. 7 illustrates two different micromirror motions defined by dual height support using variation of support positions.

FIG. 7 shows another scheme of the surface profile shape memory. To have various motion of micromirror, sometimes two different support 72 heights are needed. The two different heights of supports are fabricated with position variation. The substrate 71 itself can also be used as a support. The shape of the support 72 does not need to be a pole shape. It can be any kind of geometrical structure to enhance the surface profile shape memory. To have various motion of micromirror, the support height can be varied more than two kinds.

To fabricate the structure of two different support 72, 75 heights, an additional process should be added. The support 72, 75 structures with two different heights are grown with two different processes. After growing the support, the sacrificial layer 74 and the micromirror structure 73 is grown. Then finally the sacrificial layer 74 is removed and the designed surface is formed.

Figure 8:
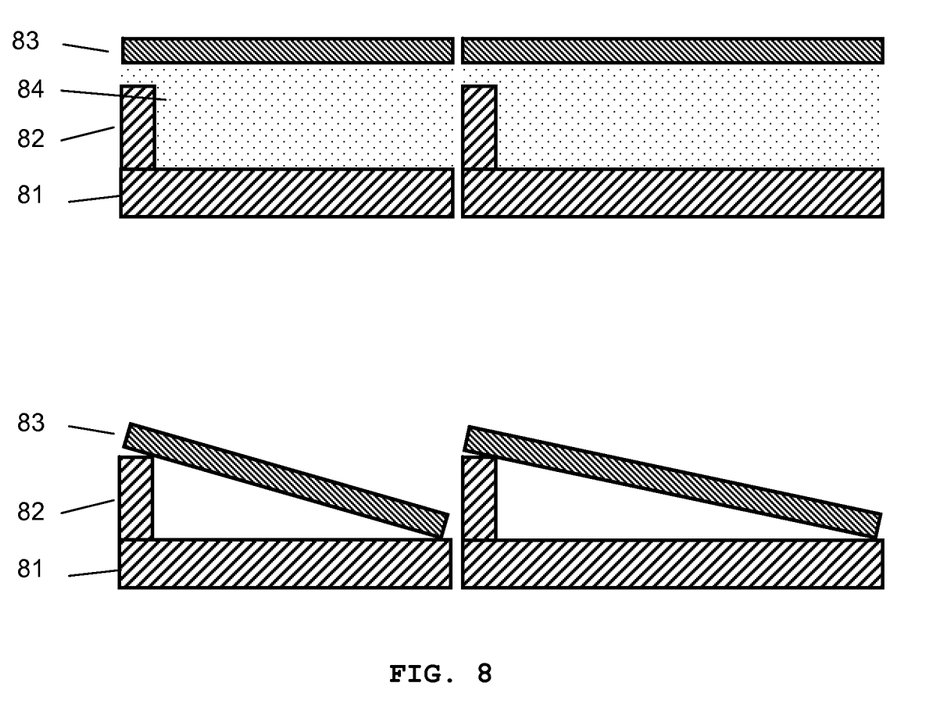
FIG. 8 illustrates two different micromirror motions defined by micromirror size with fixed support height and position.

In FIG. 8, another structure variation is illustrated for forming a designed surface. The micromirror motion is defined by the size of the micromirror 83 instead of position or height of the support 82. The fabrication of the structure is the same as before. The support 82 structure is processed and the sacrificial layer 84 is overgrown on the substrate 81. The overgrown sacrificial layer 84 is planarized by the chemical mechanical polishing process. And then the micromirror structure 83 is deposited on top of the planarized sacrificial layer 84. Even though the vertical arrangement of the layers and the position of the support are the same in two micromirror structures 83, the rotational motion of the micromirror is quite different. The smaller micromirror has steeper angle of rotational motion. The larger micromirror has a smaller angle of rotational motion. With the variation of the size, the micromirror motion is determined. While and/or after the releasing process, the micromirror forms the designed surface. The size of the micromirror is determined to satisfy the phase matching condition of forming a lens. The advantage of the structure is that simple structure defines the determined surface.

Figure 9:
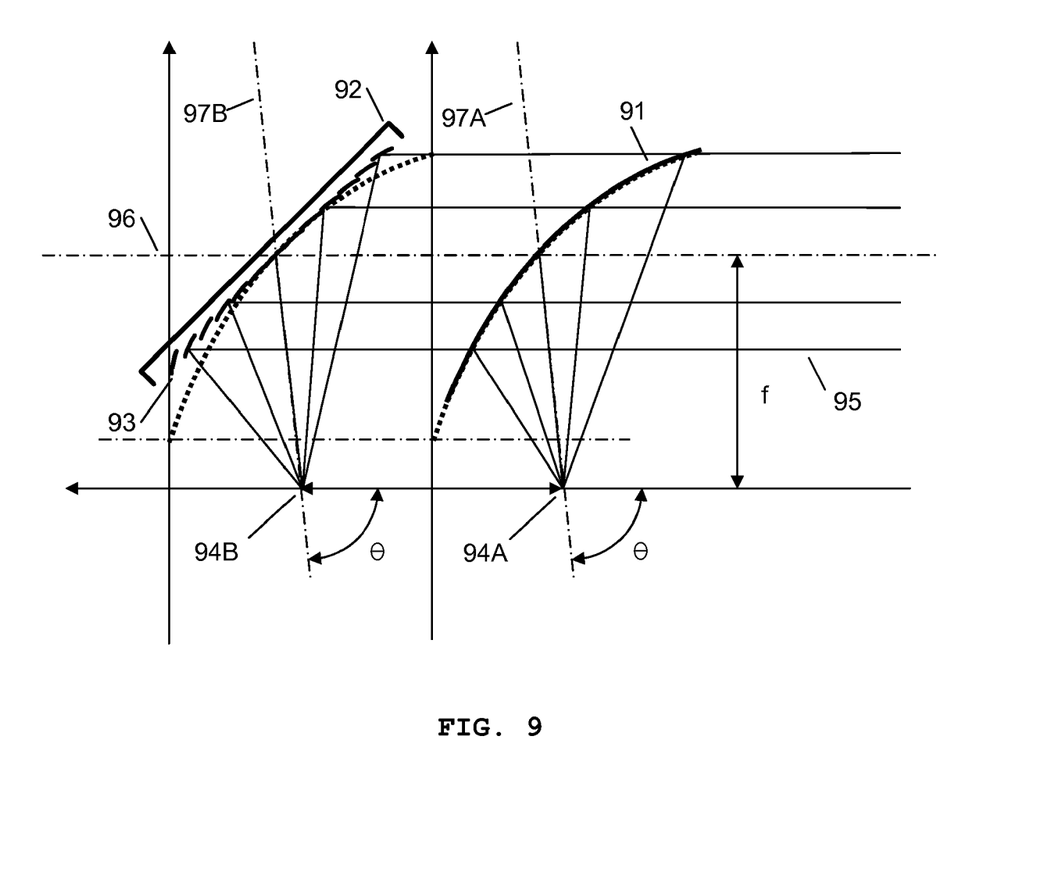
FIG. 9 shows an example of the designed surface which reproduces an off-axis paraboloid.

In FIG. 9, an example of surface design of MMAL is shown. In this case the MMAL 92 has a function of an off-axis parabolic mirror 91. The optical axis 96, 97A, 97B of the system is tilted with an amount of angle θ. The conventional off-axis parabolic mirror 91 is described in right part of the figure. All the parallel light 95 with the optical axis 96 of the paraboloid is focused into the focal point 94A. In left part of the figure, the off-axis parabolic mirror 91 is reproduced by the MMAL 92. Each micromirror 93 reflects the incident light 95 into the focal point 94B as the continuous conventional paraboloid 91 does. And the surface of the MMAL 92 is recalibrated to satisfy the phase matching condition along with the convergence condition. The surface profile made of micromirrors forms a designed surface. Then the designed surface is fabricated and formed while and/or after the releasing process. Even more the MMAL corrects aberration of the system by controlling the each micromirror in the MMAL. The MMAL acts as an adaptive optical element by itself.

While the invention has been shown and described with reference to different embodiments thereof, it will be appreciated by those skills in the art that variations in form, detail, compositions and operation may be made without departing from the spirit and scope of the invention as defined by the accompanying claims.

What is claimed is:

1. A Micromirror Array Lens with fixed focal length comprising a substrate and a plurality of micromirrors having reflecting surfaces, wherein each micromirror has at least one micro mechanical element including a support configured to support the micromirror, wherein the micromirrors form and maintain a designed surface using a stiction force, wherein the sizes of the micromirrors and the positions of the supports are selected to form the designed surface having an optical focusing power as a lens and satisfying convergence condition and phase matching condition.

2. The Micromirror Array Lens with fixed focal length of claim 1, wherein a surface profile shape memory is built in the structure of the micro mechanical elements of the micromirrors to form the designed surface.

3. The Micromirror Array Lens with fixed focal length of claim 2, wherein the micro mechanical elements of each micromirror are fabricated to determine motion of the micromirror and to form the designed surface.

4. The Micromirror Array Lens with fixed focal length of claim 1, wherein the support or supports are located between the reflecting surface of the micromirror and the substrate of the Micromirror Array Lens.

5. The Micromirror Array Lens with fixed focal length of claim 1, wherein the heights of the supports are selected to form the designed surface.

6. The Micromirror Array Lens with fixed focal length of claim 1, wherein the designed surface is formed by electrostatic force between the micro mechanical elements and the micromirrors.

7. The Micromirror Array Lens with fixed focal length of claim 1, wherein the designed surface is formed by the stiction force between the micro mechanical elements and the micromirrors in the Micromirror Array Lens while releasing the structures of the micro mechanical elements and the micromirrors.

8. The Micromirror Array Lens with fixed focal length of claim 7, wherein the designed surface is formed by the initial operation of the Micromirror Array Lens.

9. The Micromirror Array Lens with fixed focal length of claim 7, wherein the support for each micromirror is the substrate.

10. The Micromirror Array Lens with first focal length of claim 7, wherein the designed surface is maintained by the stiction force and electrostatic force between the micro mechanical elements and the micromirrors.

11. The Micromirror Array Lens with fixed focal length of claim 7, wherein the designed surface of the Micromirror Array Lens is formed and arranged in a flat surface.

12. The Micromirror Array Lens with fixed focal length of claim 7, wherein the designed surface is formed and arranged in a surface with a curvature.

13. The Micromirror Array Lens with fixed focal length of claim 7, wherein the designed surface is prepared to correct aberration of an optical system, wherein the sizes of the micromirrors and the positions of the supports are selected to correct aberration of the optical system.

14. The Micromirror Array Lens with fixed focal length of claim 7, wherein the designed surface reproduces conic surfaces.

15. The Micromirror Array Lens with fixed focal length of claim 7, wherein the designed surface reproduces aspherical surfaces.

16. The Micromirror Array Lens with fixed focal length of claim 7, wherein the designed surface reproduces anamorphic aspherical surfaces.

17. The Micromirror Array Lens with fixed focal length of claim 7, wherein the designed surface reproduces free surfaces.

18. The Micromirror Array Lens with fixed focal length of claim 7, wherein the designed surface reproduces a Fresnel type reflective lens.

19. The Micromirror Array Lens with fixed focal length of claim 7, wherein the designed surface reproduces a diffractive optical element.

20. The Micromirror Array Lens with fixed focal length of claim 1, wherein the plurality of micromirrors form a Micromirror Array Lens or array of Micromirror Array Lenses.

21. The Micromirror Array Lens with fixed focal length of claim 1, wherein the shape of each micromirror are selected to form the designed surface.

22. A Micromirror Array Lens with fixed focal length comprising a substrate and a plurality of micromirrors having reflecting surfaces, wherein each micromirror has at least one micro mechanical element including a support configured to support the micromirror, wherein the micromirrors form and maintain a designed surface using a stiction force, wherein the shapes and sizes of the micromirrors are selected to form the designed surface having an optical focusing power as a lens and satisfying convergence condition and phase matching condition.

* * * * *